US006447863B1

(12) United States Patent
Lewin

(10) Patent No.: US 6,447,863 B1
(45) Date of Patent: Sep. 10, 2002

(54) FLEXIBLE LABELING SYSTEM

(76) Inventor: Thomas M. Lewin, 1200 Nicollet Mall, #201, Minneapolis, MN (US) 55403

( * ) Notice: Subject to any disclaimer, the term of this patent is extended or adjusted under 35 U.S.C. 154(b) by 17 days.

(21) Appl. No.: 09/650,445

(22) Filed: Aug. 29, 2000

(51) Int. Cl.[7] .................................................. B32B 3/06

(52) U.S. Cl. ..................... 428/40.1; 428/42.2; 428/194; 428/136; 428/137; 40/359; 40/630

(58) Field of Search ................................ 428/42.2, 194, 428/136, 167, 40.1; 40/359, 630; 402/3

(56) References Cited

U.S. PATENT DOCUMENTS 5,902,659 A * 5/1999 Lewin ....................... 428/42.2

* cited by examiner

*Primary Examiner*—Alexander S. Thomas

(74) *Attorney, Agent, or Firm*—Hugh D. Jaeger

(57) ABSTRACT

A flexible labeling system applied to spines of various bound documents such as books without imprinted or embossed titles on their back bindings, wire coil bound documents, plastic comb bound documents, photo albums, compact disc jewel boxes, record album jackets which are too thin to readily hold identification labels, and brochures of various kinds that have no identification means that can be seen when they are standing side-by-side on shelves. The flexible labeling system permits users to easily and conveniently provide labeling for these types of documents. The flexible labeling system is comprised of a flexible plastic member incorporating two living hinges created by a pair of parallel V-shaped grooves, either continuous or segmented, or perforations which are either die-cut or stamped into the flexible plastic member. Also incorporated are two opposing adhesive strips secured to the flexible plastic member, each adhesive strip being provided with a peel-off protective strip. The V-shaped grooves or perforations are die-cut or stamped slightly shorter than the length of the flexible plastic member to prevent tearing.

21 Claims, 8 Drawing Sheets

FLEXIBLE LABELING SYSTEM

CROSS REFERENCES TO CO-PENDING APPLICATIONS

None.

BACKGROUND OF THE INVENTION

1. Field of the Invention

The present invention is for a flexible labeling system, and more particularly, pertains to a labeling system which identifies magazines, photo albums, file folders, compact disc jewel boxes, record album jackets and other narrow documents which have a spine that is too small for recognizable print.

2. Description of the Prior Art

Prior art labeling systems provided a labeling means in the form of an adhesive pocket for labels which is applied directly to the spine of a ring binder or other such thick document, or in the form of a metal pocket which can hold labels and which clips to the spine of a wide ring binder or the like. There are also labeling systems which are secured to the front and open sides of a file, record album jacket or document. Clearly what is needed is a labeling system for the spines of narrow documents which is easily readable when resting upright on a shelf and also which flexes when the document is opened to prevent damage to the document and the label.

3. Relevant Patent

U.S. Pat. No. 5,902,659 entitled "Flexible Labeling System", dated May 11, 1999, filed on May 16, 1997, by the same inventor, Thomas M. Lewin, 1200 Nicollet Mall, #201, Minneapolis, Minn., 55403.

SUMMARY OF THE INVENTION

The general purpose of the present invention is to provide a flexible labeling system for magazines, photo albums, compact disc jewel boxes, record album jackets, and other thin documents where the label is easily visible while the labeled material rests upright on a shelf. The flexibility of the flexible labeling system allows the labeled material to be opened and read without the label falling off, and without damage to the labeled material.

According to one embodiment of the present invention, there is provided a flexible labeling system, including flexible plastic members, living hinges, V-shaped grooves or perforations, adhesive strips, peel-off protective strips and a labeling means such as, but not limited to, an adhesive label.

One significant aspect and feature of the present invention is a one-piece flexible plastic member including two opposing, flexible plastic side portions which are hinged to opposite sides of a flexible plastic center portion and which bend easily while the flexible plastic center portion continues to remain flat.

Another significant aspect and feature of the present invention is the provision of adhesive strips composed of an adhesive which will permanently secure when a permanent installation is desired or composed of an alternative adhesive which can be easily removed when a temporary installation is desired.

A further significant aspect and feature of the present invention is a pair of V-shaped grooves, either continuous or segmented, which create living hinges.

An additional significant aspect and feature of the present invention is an open space along the spine of a document that allows the document to be easily opened without damaging the labeling system or the document.

Still another significant aspect and feature of the present invention is the ability to label narrow documents on their spines in such a manner as to provide a visible identification label when the documents are shelved.

Yet another significant aspect and feature of the present invention is the provision and use of a clear, plastic, Braille embossed label adhered over the visible identification label which allows the visually impaired and blind, as well as the sighted, to use the flexible labeling system.

Having thus described significant aspects and features of the present invention, it is the principal object of the present invention to provide a flexible labeling system.

One object of the present invention is to provide a labeling system for narrow documents which can be easily read when the documents are shelved.

Another object of the present invention is to provide a document labeling system which will not tear when the document is repeatedly opened and closed.

A further object of the present invention is to provide a document labeling system having an open space along the spine of the document which allows easy opening and closing of the document without damaging the document or the label.

Yet another object of the present invention is to provide a flexible labeling system which is made of a single piece of plastic with die-cut or stamped V-shaped grooves, either continuous or segmented, or perforations which create living hinges.

A further object of the present invention is to provide a labeling system that can be used by the sighted, visually impaired, and blind.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
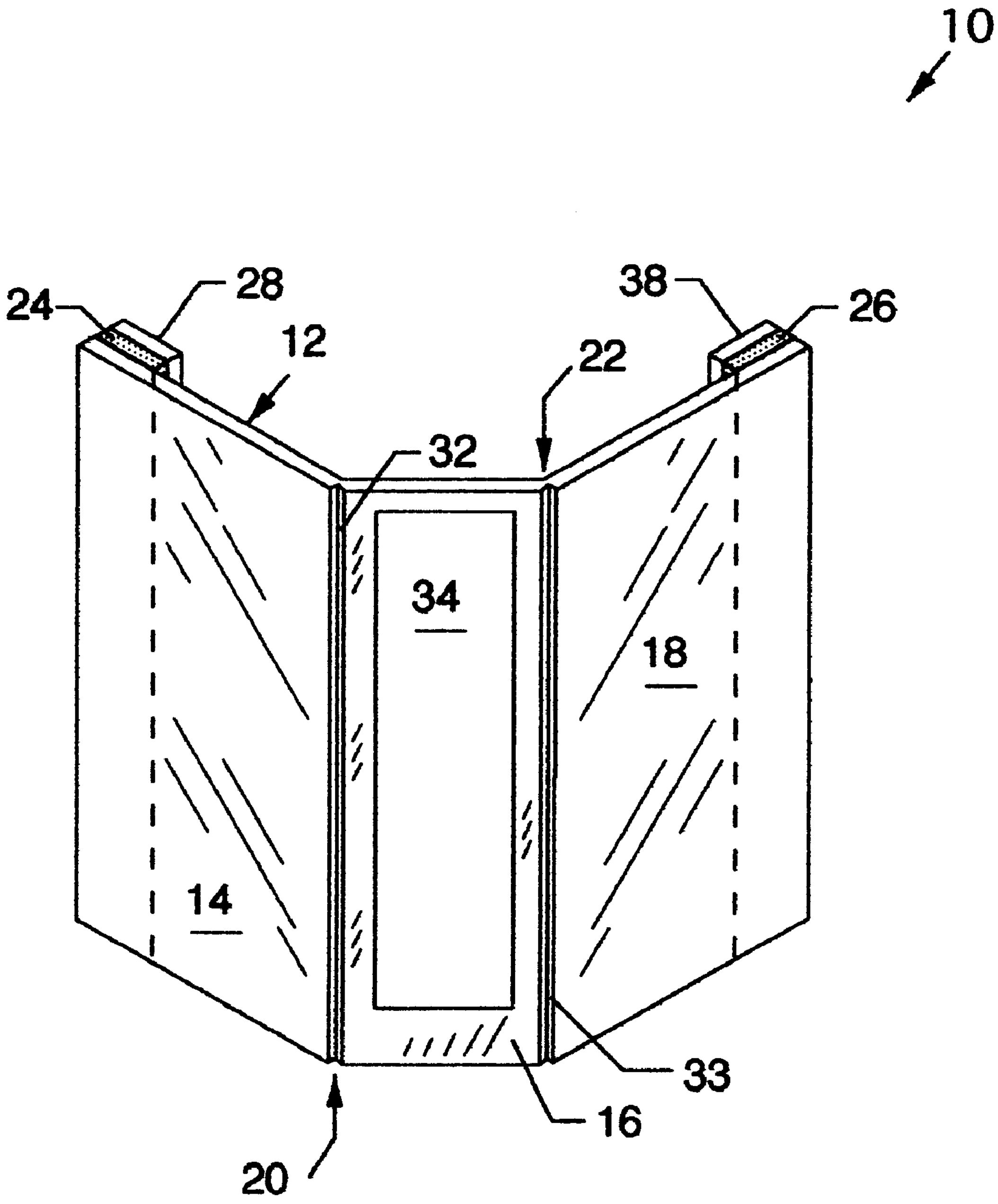
FIG. 1 illustrates an isometric view of a flexible labeling system, the present invention.
Figure 6:
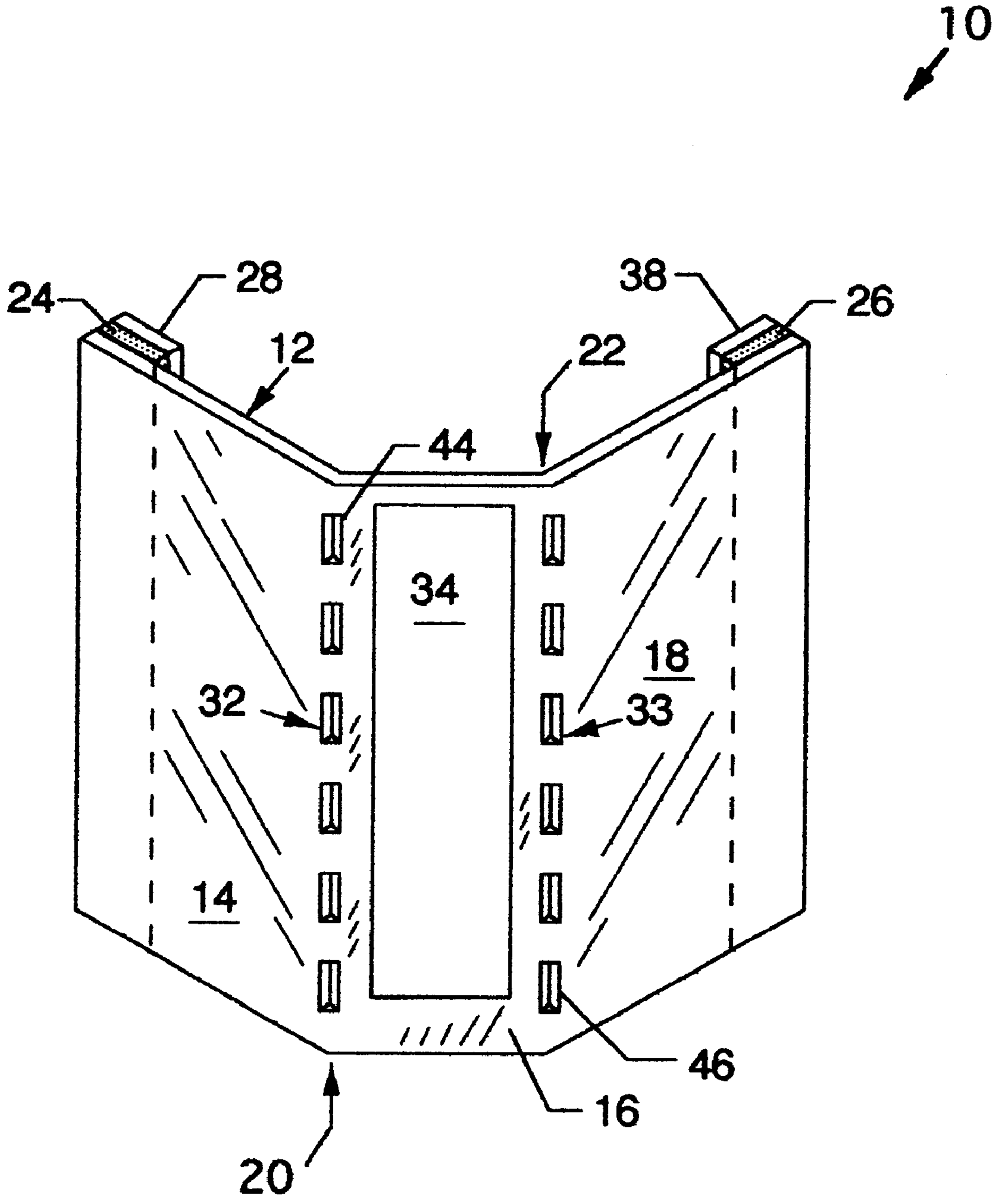
FIG. 6 illustrates another isometric view of the flexible labeling system but showing a different form of the V-shaped grooves from that illustrated in FIG. 1.

FIG. 1 illustrates a an isometric view of a flexible labeling system 10, the present invention. The flexible labeling system 10 is comprised of a substantially planar one-piece, flexible plastic member 12 made of high density polyethylene (HDPE), Mylar (polyethylene terephthalate) film or other suitable plastic having top and bottom edges and front and back sides and including three flexible plastic portions, namely, a first side portion 14, a center portion 16, and a second side portion 18, connected by living hinges 20 and 22. The living hinges 20 and 22 are created by either die-cutting or stamping a pair of V-shaped grooves 32 and 33 in the front or rear side of the flexible plastic member 12. These V-shaped grooves 32 and 33, which are shown in greater detail in FIG. 2, may extend in one continuous length from the top edge to the bottom edge in the front of the flexible plastic member 12, as depicted in FIG. 1, or alternatively and without compromising the desired effect, may be in the form of a series of spaced segments of variable lengths (similar in nature to perforations except that they do not pass entirely through the thickness of the flexible plastic member 12) extending between the top and bottom edges in the front of the flexible plastic member 12, as depicted in FIG. 6. In either case, the V-shaped grooves 32 and 33 may run the full height of the flexible plastic member 12 so as to intersect the top and bottom edges of the flexible member 12, as illustrated in FIG. 1, but they do not necessarily have to run the entire height of the flexible plastic member 12. They may also be located in the front or rear side of flexible plastic member 12. Instead, they may terminate slightly short of the top and bottom edges of the flexible plastic member 12, as shown in FIG. 6, in connection with the segmented form of the V-shaped grooves, in which case the flexible labeling system 10 will exhibit a more tear-resistant quality. The living hinges 20 and 22 may also be created by a perforation (FIG. 8) which also may or may not run the entire height of flexible plastic member 12. The center portion 16 can be a substantially flat planar member, as can be the first and second side portions 14 and 18. Each of the portions 14, 16 and 18 has a front or exterior side and a back or interior side. Adhesive strips 24 and 26 are adjacently aligned along the outer edge portions of the back or interior sides of the flexible plastic portions 14 and 18, as illustrated in greater detail in FIGS. 2 and 3. Peel-off protective strips 28 and 30 cover adhesive strips 24 and 26 prior to use. The adhesive strips 24 and 26 are made of, but not limited to, 3M F-9415PC low tack adhesive material which does not permanently set; so, if the flexible labeling system 10 only needs to be used temporarily, the flexible labeling system 10 may be easily removed and the peel-off protective strips 28 and 30 may be replaced over the adhesive strips 24 and 26 for future reuse. If the flexible labeling system 10 is to be permanent, the adhesive strips 24 and 26 are made of, but not limited to, 3M 950 tape, which is a high tack adhesive which will permanently set. and secure to the document. Additional information on the adhesives is provided in Appendix 1. An adhesive information label 34 is mounted to the front or exterior side of the flexible plastic center portion 16 for visual identification purposes. It is understood that the size of the label 34 is relative to the size of center portion 16, but can be smaller, if desired. Labeling of the document may also be attained by writing directly on the front or exterior side of flexible plastic center portion 16. For the benefit of visually impaired and blind users, a clear embossed plastic Braille information strip may be adhered to flexible plastic portion 16 over adhesive label 34. The clear embossed plastic Braille information strip allows the visually impaired and blind to be able to identify the labeled material without covering the text of the adhesive label 34 which the sighted users could still use. Of course, if no label for the sighted users is used, an opaque Braille labeling material may be used. It is also understood that an adhesive strip, similar to peel-off protective strips 24 and 26, with a peel-off protection strip, similar to peel-off protective strips 28 and 30, can be used in lieu of the illustrated adhesive label 34, so that a non-adhesive label can be applied to the adhesive strip once the peel-off strip has been removed.

Figure 2:
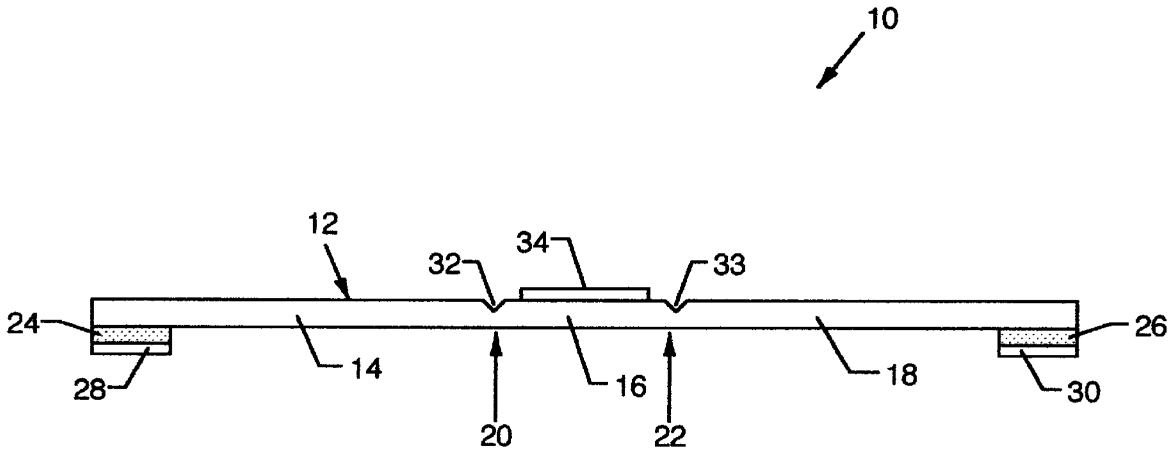
FIG. 2 illustrates an exaggerated end view of the flexible labeling system before bending at the V-shaped grooves.
Figure 3:
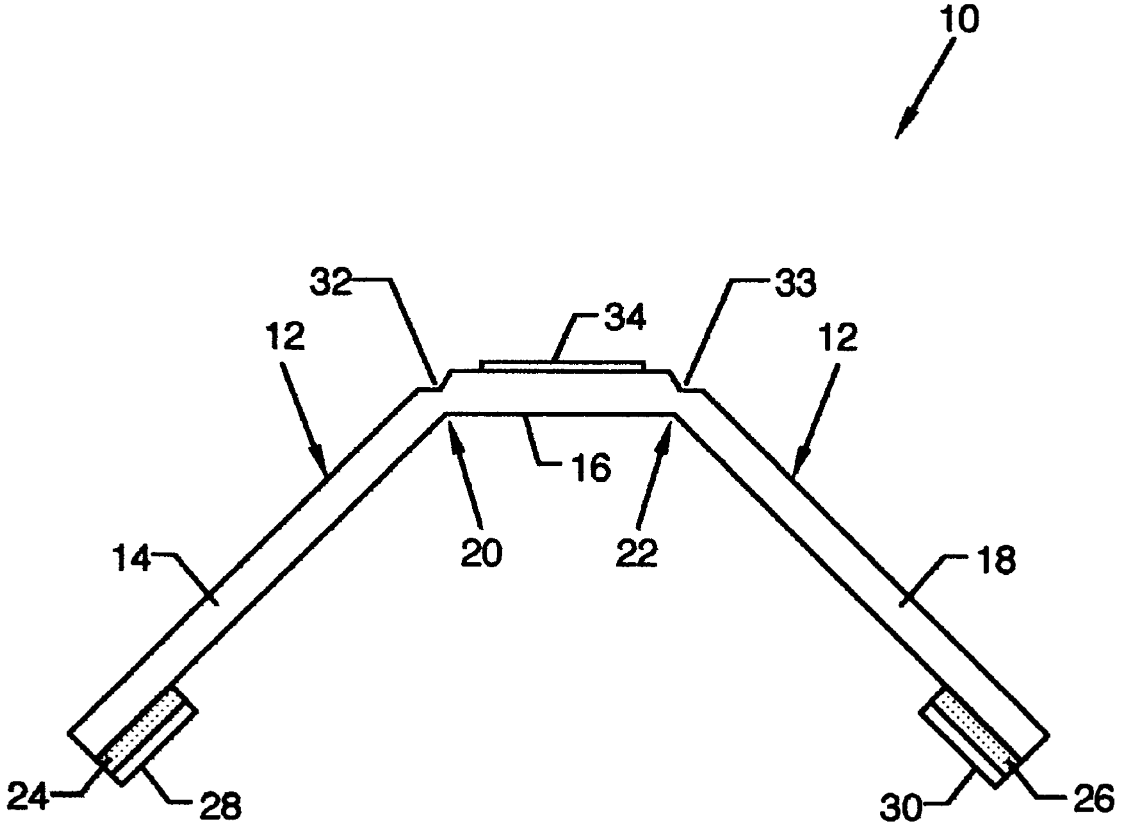
FIG. 3 illustrates an exaggerated end view of the flexible labeling system after bending at the V-shaped grooves.

FIG. 2 illustrates an exaggerated end view of the flexible labeling system 10 before bending at the V-shaped grooves 32 and 33, and FIG. 3 illustrates an exaggerated end view of the flexible labeling system 10 after bending at the V-shaped grooves 32 and 33, where all numerals correspond to those elements previously described. These figures further illustrate the construction of the flexible labeling system 10. Shown in detail are the adhesive strips 24 and 26, the peel-off protective strips 28 and 30, and the V-shaped grooves 32 and 33 which are either die-cut or stamped into the flexible plastic member 12 and which create the living hinges 20 and 22.

Preferably, the adhesive strips 24 and 26 extend along the entire interior edges of the flexible plastic portions 14 and 18, but this arrangement is not essential. Instead, the adhesive strips 24 and 26 could be in the form of discrete segments spaced along the interior edges of the flexible plastic portions 14 and 18. In this case, peel-off protective strips 28 and 30 having the same size as the individual segments can be provided, or peel-off protective strips 28 and 30 each having a length sufficient to cover all of the segments along a respective edge can be utilized.

The V-shaped grooves 32 and 33 are die-cut or stamped into the flexible plastic member 12 in a parallel fashion and create the flexible plastic portions 14, 16 and 18. These V-shaped grooves 32 and 33 weaken the strength of the flexible plastic member 12 and create the living hinges 20 and 22 when the flexible plastic member 12 is bent at the V-shaped grooves 32 and 33, permitting flexible plastic portion 16 to remain flat in order to provide better viewing of the to-be-attached label.

MODE OF OPERATION

Figure 4:
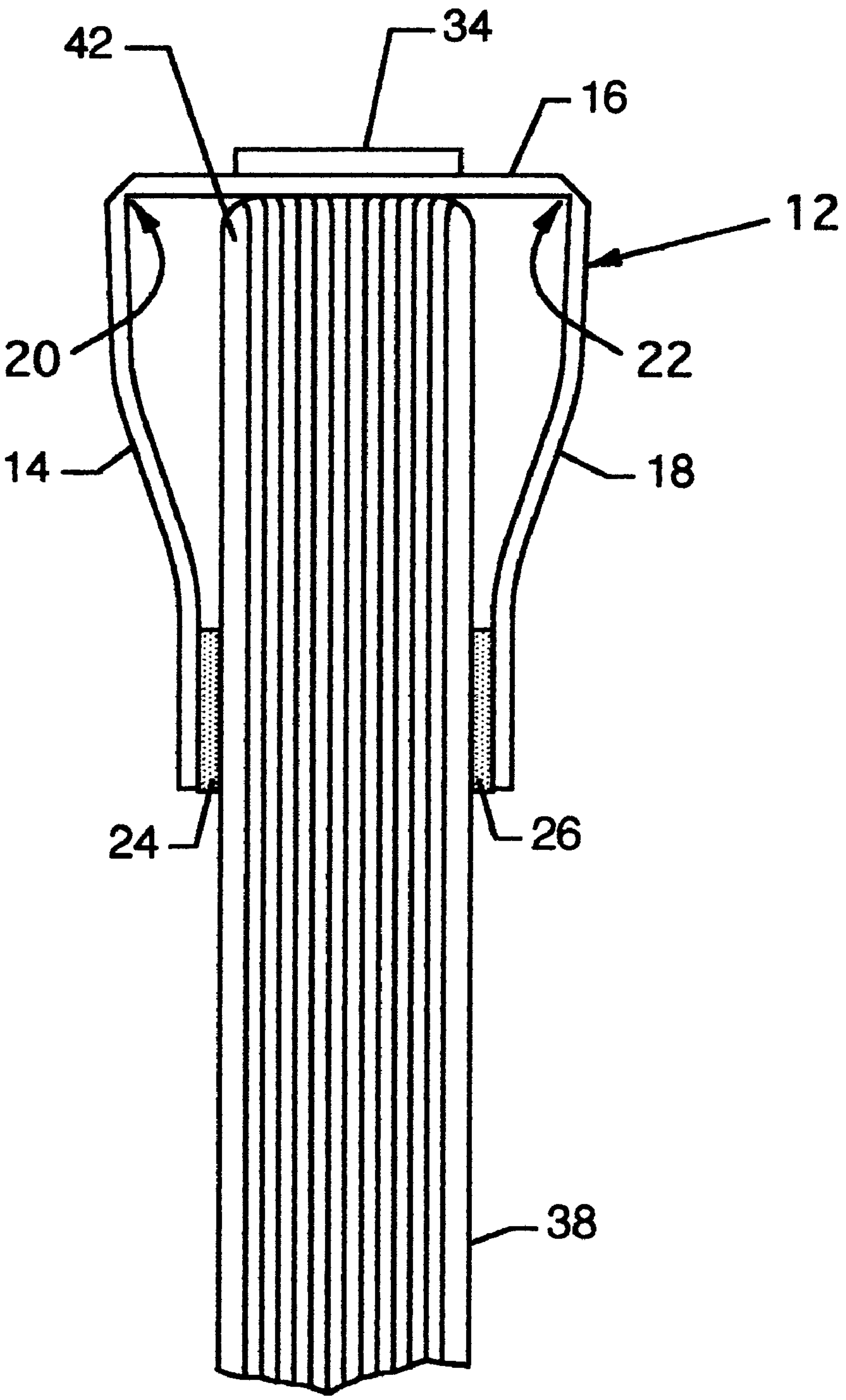
FIG. 4 illustrates an exaggerated end view of the flexible labeling system properly attached to a magazine in the closed position.

FIG. 4 illustrates an exaggerated end view of the flexible labeling system 10 properly attached to a magazine 38 in the closed position, where all numerals mentioned previously correspond to those elements previously described. A magazine 38 having spine 42 is used for illustrative purposes, but the flexible labeling system 10 can be effectively used with photo albums, brochures, files, folders, compact disc jewel boxes, record album jackets or any other item on which a visible label is needed when shelved. Illustrated in detail is the flex exhibited by flexible plastic portions 14 and 18 of the flexible plastic member 12. In order to maintain consistent vertical alignment of the flexible labeling system 10 along the spine 42 of a magazine 38, the spine 42 of magazine 38 is aligned along living hinge 20 where peel-off protective strip 28 (shown in FIG. 3) is removed from adhesive strip 24 and flexible plastic portion 14 is secured to the magazine 38, as shown. The spine 42 of magazine 38 is then centered on the interior of flexible plastic portion 16. Peel-off protective strip 30 (shown in FIG. 3) is then removed from adhesive strip 26 and flexible plastic portion 18 is also secured to the magazine 38, as shown. Magazine 38 is used for illustrative purposes; a photo album, book, brochure, file, folder, compact disc jewel box, record album jacket, etc. can be substituted for magazine 38.

Figure 5:
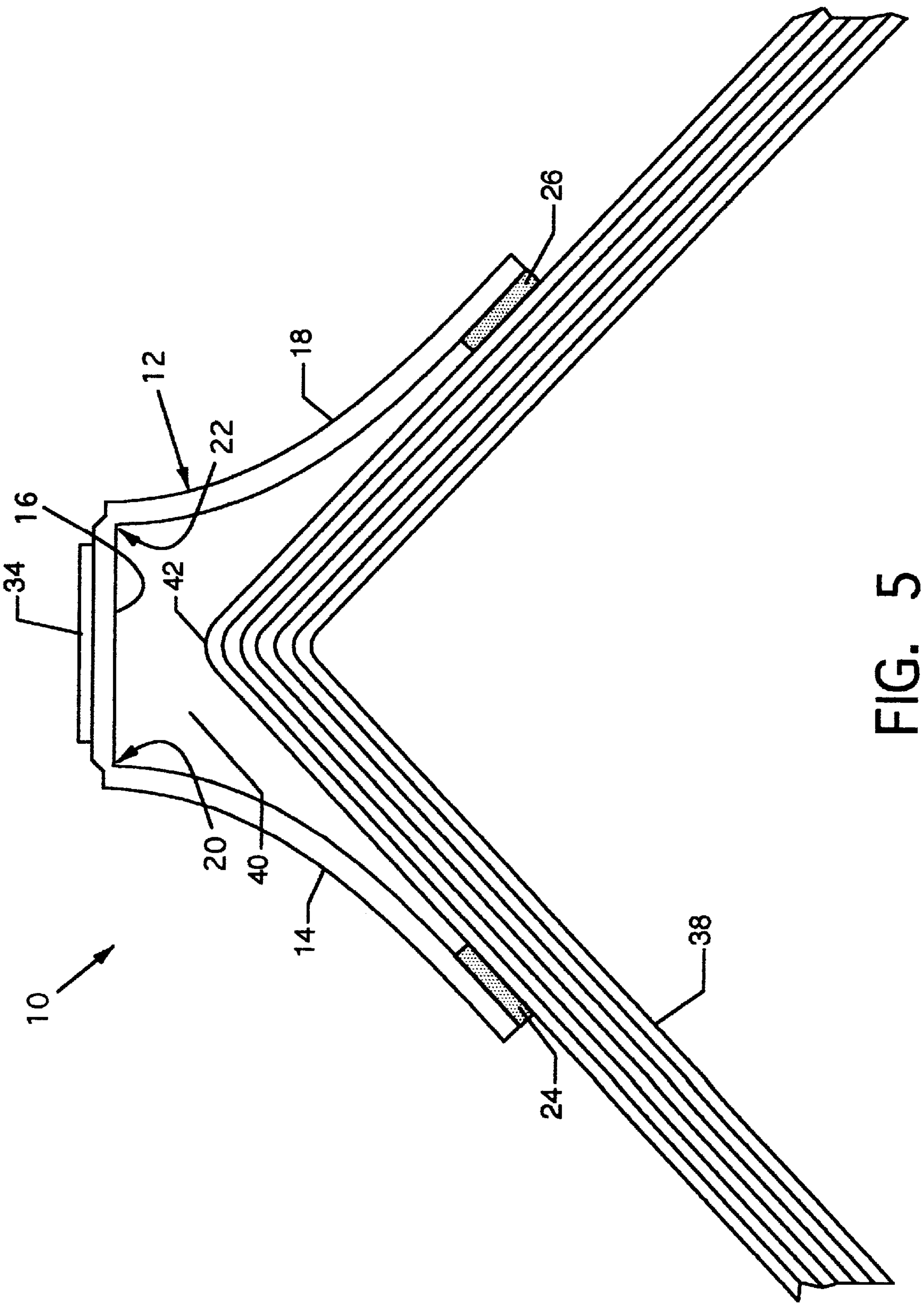
FIG. 5 illustrates an exaggerated end view of the flexible labeling system properly attached to a magazine in the open position.

FIG. 5 illustrates an exaggerated end view of the flexible labeling system 10 properly attached to a magazine 38 in the open position, where all numerals mentioned previously correspond to those elements previously described. Illustrated in particular is the flex exhibited by flexible plastic side portions 14 and 18 and the variable geometry space 40 between flexible plastic center portion 16 and the spine 42 of magazine 38. The variable geometry of space 40 is dependent on the extent of openness of the magazine 38.

FIG. 6 illustrates an isometric view of the flexible labeling system 10, where all numerals mentioned previously correspond to those elements previously described. Illustrated in particular is the aforementioned alternative construction of the V-shaped grooves in the form of a series of spaced segments 44 and 46 (similar in nature to perforations except that they only extend partially rather than entirely through the thickness of the flexible plastic member 12) which may be of variable lengths. Although the uppermost and lowermost segments of each V-shaped groove 32 and 33 can intersect the top and bottom edges of the flexible plastic member 12, it is preferred that the uppermost and lowermost segments of each V-shaped groove 32 and 33 terminate short of the top and bottom edges of the flexible plastic member 12 to thereby produce a virtually tear-proof flexible labeling system 10.

Figure 7:
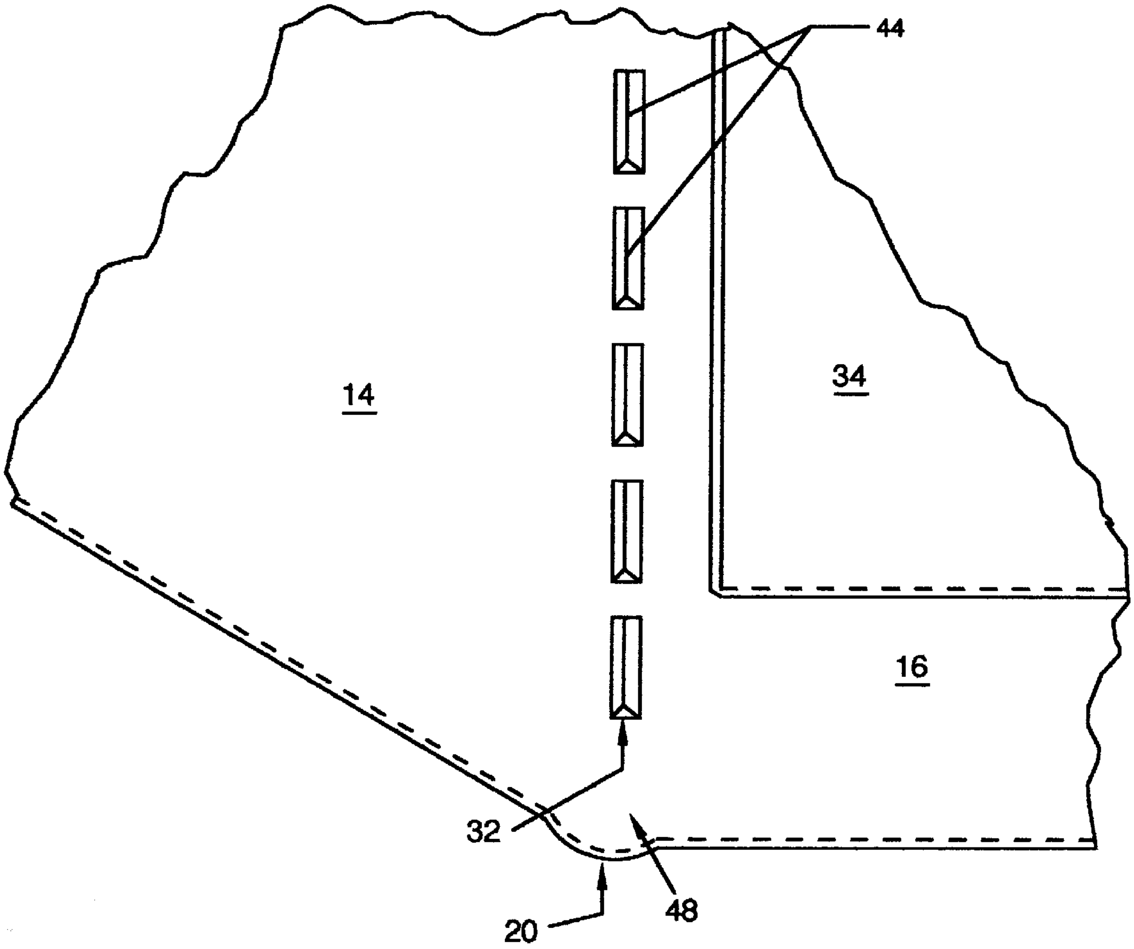
FIG. 7 illustrates a magnified view of the lower end of a living hinge created by a V-shaped groove formed of a series of spaced segments; and, FIG. 8 illustrates a magnified view o the lower end of a living hinge created by perforations.

FIG. 7 illustrates a magnified view of the lower end of living hinge 20 created by V-shaped groove 32 in the form of a series of spaced segments 44, where all numerals mentioned previously correspond to those elements previously or otherwise described. Illustrated also is an area 48 where the lowermost segment 44 does not extend to the bottom edge of the flexible plastic member 12 but terminates short thereof. This construction creates a virtually tear-proof flexible labeling system 10. It is to be understood that, in similar fashion, the uppermost segment 44 of the V-shaped groove 32 would not intersect the top edge of the flexible plastic member 12 but would terminate short thereof, again to achieve tear resistance. Of course, the V-shaped groove 33 composed of the series of spaced segments 46 is made in similar manner to the V-shaped groove 32 just described.

Figure 8:
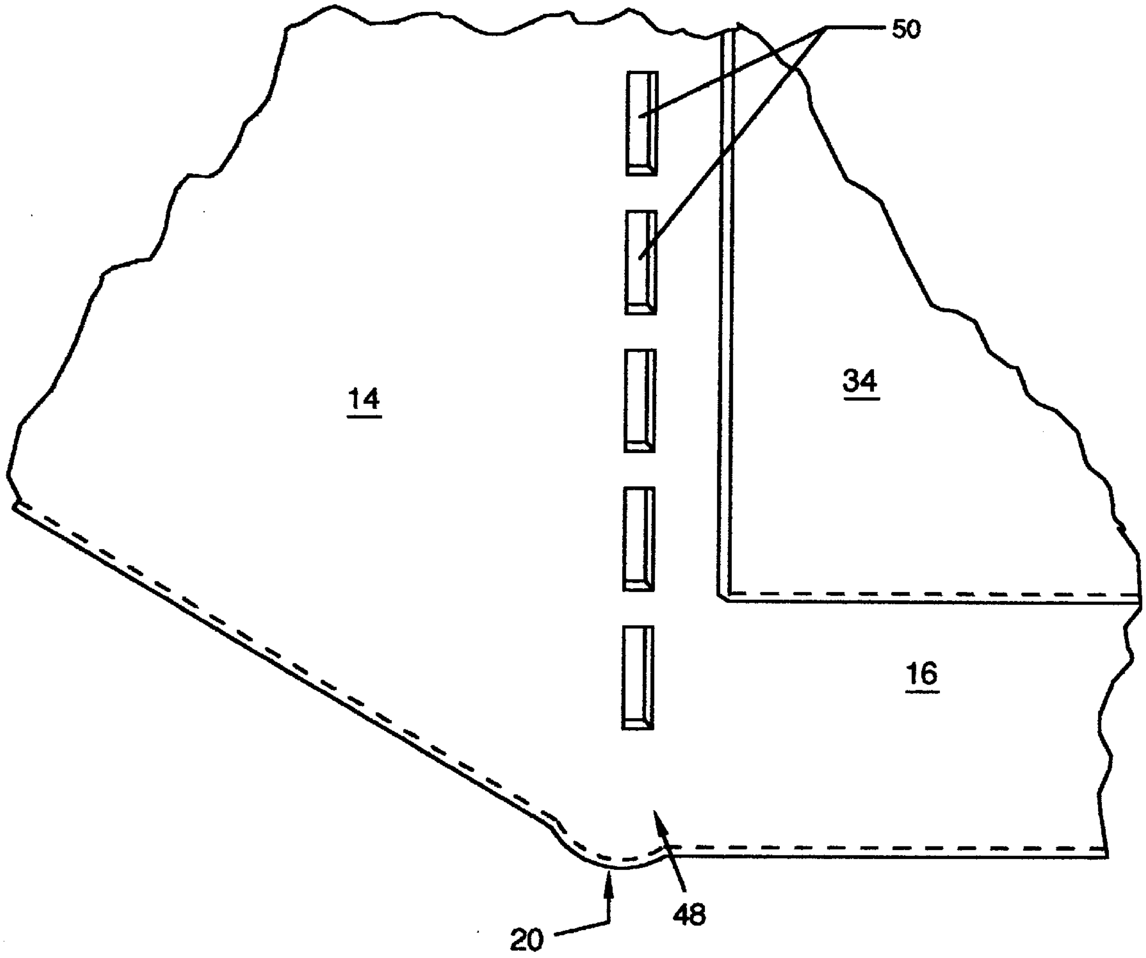

FIG. 8 illustrates a magnified view of the lower end of living hinge 20 created by perforations 50, where all numerals correspond to those elements previously described or otherwise described. The perforations 50 which are die-cut or stamped completely through flexible plastic member 12 also create a living hinge. Illustrated also is an area 48 where the lowermost perforation 50 does not extend to the bottom edge of the flexible plastic member 12 but terminates short thereof. This construction creates a virtually tear-proof flexible labeling system 10. It is to be understood that, in similar fashion, the uppermost perforation 50 would not intersect the top edge of the flexible plastic member 12 but would terminate short thereof, again to achieve tear resistance. It is understood that perforations 50 may run the entire height of flexible plastic member 12.

FLEXIBLE LABELING SYSTEM

PARTS LIST

10 flexible labeling system
12 flexible plastic member
14 flexible plastic portion (first side portion)
16 flexible plastic portion (center portion)
18 flexible plastic portion (second side portion)
20 living hinge
22 living hinge
24 adhesive strip
26 adhesive strip
28 peel-off protective strip
30 peel-off protective strip
32 V-shaped groove
33 V-shaped groove
34 adhesive label
38 magazine
40 space
42 spine
44 segment
46 segment
48 area
50 perforations Various modifications can be made to the present invention without departing from the apparent scope hereof.

It is claimed:

1. A flexible labeling system, comprising:

a. a one-piece, flexible plastic member having top and bottom edges and front and back sides, said one-piece flexible plastic member including first and second side portions and a center portion located between said first and second side portions, each of said first and second side portions having an outer edge;

b. a first living hinge connecting said first side portion to said center portion, and a second living hinge connecting said second side portion to said center portion;

c. each of said first and second living hinges being formed by a groove formed in the material of said one-piece, flexible plastic member on said front side;

d. a first adhesive strip extending along said outer edge of said first side portion on said back side; and a second adhesive strip extending along said outer edge of said second side portion on said back side;

e. said center portion having a surface for accommodating a label;

f. each of said grooves extends in one continuous length between said top and bottom edges; and, g. each of said grooves terminates short of said top and bottom edges.

2. The flexible labeling system as defined in claim 1, wherein said first and second living hinges are parallel to each other and perpendicular to said top and bottom edges.

3. The flexible labeling system as defined in claim 1, wherein said one-piece, flexible plastic member is rectangular.

4. The flexible labeling system as defined in claim 1, wherein each of said grooves is in the form of a series of spaced segments extending between said top and bottom edges.

5. The flexible labeling system as defined in claim 1, wherein each of said grooves intersects said top and bottom edges.

6. The flexible labeling system as defined in claim 1, wherein each of said grooves is V-shaped.

7. The flexible labeling system as defined in claim 6, wherein each of said grooves is continuous.

8. The flexible labeling system as defined in claim 6, wherein each of said grooves is segmented.

9. The flexible labeling system as defined in claim 1, wherein the adhesive of said adhesive strips is a low tack adhesive which does not permanently set.

10. The flexible labeling system as defined in claim 1, wherein the adhesive of said adhesive strip is a high tack adhesive which will permanently set.

11. The flexible labeling system as defined in claim 1, wherein each of said adhesive strips is covered with a peel-off protective strip.

12. The flexible labeling system as defined in claim 1, wherein said first and second side portions are substantially equal in size.

13. The flexible labeling system as defined in claim 1, wherein said center portion is smaller in size than either of said first and second side portions.

14. The flexible labeling system as defined in claim 1, wherein said first and second side portions have substantially equal widths, and wherein the width of said center portion is less than the width of either of said first and second side portions.

15. The flexible labeling system as defined in claim 1, and further comprising an information label affixed to said surface of said center portion.

16. The flexible labeling system as defined in claim 15, including a clear embossed Braille information strip positioned over said information label and adhered thereto.

17. The flexible labeling system as defined in claim 1, wherein said one-piece, flexible plastic member is substantially planar.

18. The flexible labeling system as defined in claim 1, wherein each of said grooves extends through said plastic member.

19. The flexible labeling system as defined in claim 1 for accommodating a label organ adhesive strip with peel-off protective strip to accommodate a non-adhesive label.

20. The flexible labeling system as defined in claim 1, further comprising an adhesive strip, affixed to said surface of said center strip, with a peel-off protective strip to accept a non-adhesive label after the peel-off protective strip has been removed.

21. A flexible labeling system, comprising:

a. a one-piece, flexible plastic member having top and bottom edges and front and back sides, said one-piece flexible plastic member including first and second side portions and a center portion located between said first and second side portions, each of said first and second side portions having an outer edge;

b. a first living hinge connecting said first side portion to said center portion, and a second living hinge connecting said second side portion to said center portion;

c. each of said first and second living hinges being formed by a groove formed in the material of said one-piece, flexible plastic member on said front side;

d. a first adhesive strip extending along said outer edge of said first side portion on said back side; and a second adhesive strip extending along said outer edge of said second side portion on said back side;

e. said center portion having a surface for accommodating a label;

f. each of said grooves is in the form of a series of spaced segments extending between said top and bottom edges; and, g. end segments of the series of spaced segments of each of said grooves terminate short of said top and bottom edges.

* * * * *